A. A. WARNER.
ELECTRICALLY HEATED UTENSIL.
APPLICATION FILED FEB. 1, 1912.
1,040,595.
Patented Oct. 8, 1912.
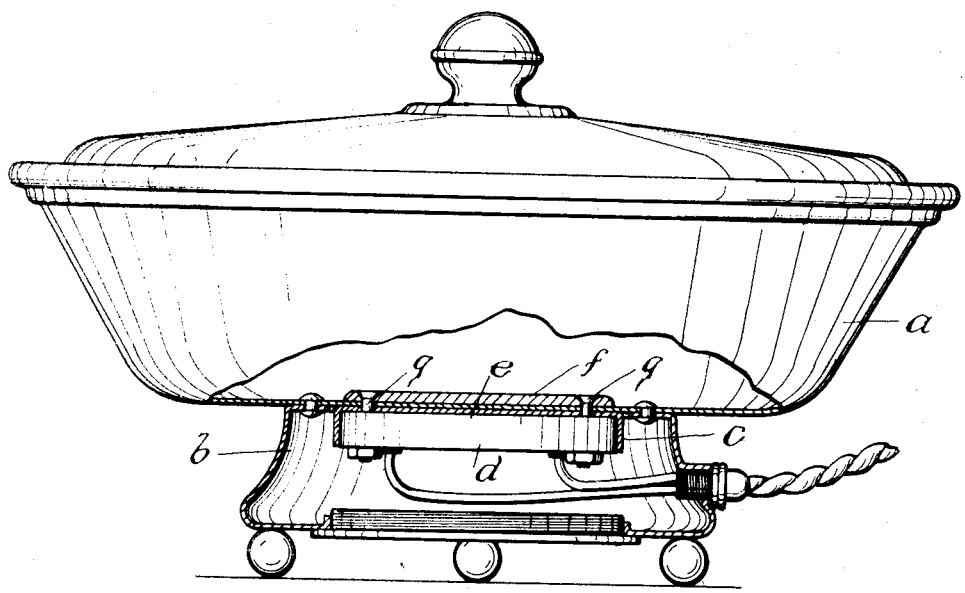
WITNESSES
INVENTOR
Alonzo A. Warner:
BY
his ATTORNEY

UNITED STATES PATENT OFFICE.

ALONZO A. WARNER, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

1,040,595.  Specification of Letters Patent.  Patented Oct. 8, 1912.

Application filed February 1, 1912. Serial No. 674,793.

*To all whom it may concern:*

Be it known that I, ALONZO A. WARNER, a citizen of the United States, and a resident of New Britain, in the county of Hartford and State of Connecticut, have invented certain new and useful Improvements in Electrically-Heated Utensils, of which the following is a specification.

My invention relates particularly to electrically heated receptacles such as hot water dishes and the like and resides more particularly in the manner of securing the heating unit in place.

The figure of the drawings illustrates an embodiment of my invention.

$a$ denotes the receptacle, $b$ the base, $c$ an inverted cup-shaped member adapted to receive the heating element $d$, one of the radiating members $e$ of which is in close contact with the side walls of the cup-shaped member, the other radiating element being operatively positioned with respect to the top of said cup-shaped member.

$f$ represents a plate located within the receptacle and $g\ g$ screws passing through this plate and through the cup-shaped member and engaging the heating element and by means of which parts are assembled and held in close contact with one another in order to provide for the ready transmission of the heat generated in the heating element to the wall of the receptacle.

It will be observed that the top of the base is apertured and that this aperture is larger than the outside diameter of the inverted cup-shaped holder $c$ to prevent the dissipation of the heat from the side walls of this holder directly to the base.

I claim as my invention:

1. In a device of the character described the combination with a receptacle and an apertured base on which it is supported, of an inverted cup-shaped member located in the aperture in the base against the underside of the receptacle, a heating element closely fitting within said cup-shaped member, a plate located within said receptacle, and means secured in said plate, passing through the abutting walls of the receptacle and cup-shaped member and engaging said heating unit.

2. In an electrically heated utensil an electrical heating unit, a holder therefor, and means anchored in the receptacle and passing through the base of said holder to engage the heating unit to secure said unit and holder in operative position with respect to said utensil.

ALONZO A. WARNER.

Witnesses:
 F. G. RUSSELL,
 H. A. TRAVER.